3,398,549
**APPARATUS FOR REGULATING AT
LOW TEMPERATURES**
Walter Zobel, Oak Ridge, Tenn., assignor to the United
States of America as represented by the United States
Atomic Energy Commission
Filed Feb. 3, 1967, Ser. No. 614,534
5 Claims. (Cl. 62—129)

ABSTRACT OF THE DISCLOSURE

A cryostatic system is provided for reducing the temperature of an environment in which semiconductors or other objects may be examined or operated, and for maintaining a selected temperature in the environment for desired periods of time. A highly conductive heat transfer element is partially enclosed in a vacuum chamber. The unenclosed portion is submerged in a cryogen fluid. The vacuum chamber pressure is controlled by a vacuum pumping system connected to the chamber and a gas flow control element which allows small portions of a gas to diffuse therethrough at a rate necessary to provide a given constant pressure. By controlling the pressure, the rate of heat transfer from the ambient atmosphere is effective in controlling the temperature of a specimen mounted on the warmer end of the heat transfer element thereby maintaining the specimen at a specific low constant temperature which is determined by the measured pressure of the vacuum chamber.

---

The invention described herein was made in the course of, or under, a contract with the United States Atomic Energy Commission.

This invention relates to the field of low temperature devices and more particularly to a cryostatic system for maintaining a desired range of low temperatures to permit examination, calibration, or operation of small objects in such an environment.

In using a lithium-drifted germanium diode type gamma radiation detector and other semiconductor particle detectors, for example, it is known to be necessary to maintain the detector at very low temperatures. This is usually accomplished by cooling the detector with some cryogenic fluid, such as liquid nitrogen. A study of the range of criticality of operating temperature has been made previously by permitting the temperature to rise or fall through the desired point while the performance was observed at the proper instant. It would be desirable to maintain the detector at a constant given temperature, not necessarily that of the cryogenic fluid, to observe properties for a period of time. This is one instance of the desirability of maintaining a specific constant low temperature.

Summary of invention

This invention is a device whose temperature may be lowered to a low temperature level through conduction from a low temperature source, and whose temperature is regulated or maintained at that low level by adjusting the pressure within the device and thereby control the external energy leakage or the absorption of heat from the ambient atmosphere. The primary object is to provide and maintain, for a desired period or periods, a temperature environment for examination, calibration or operation of small objects which may be placed in the device.

Figure 1:
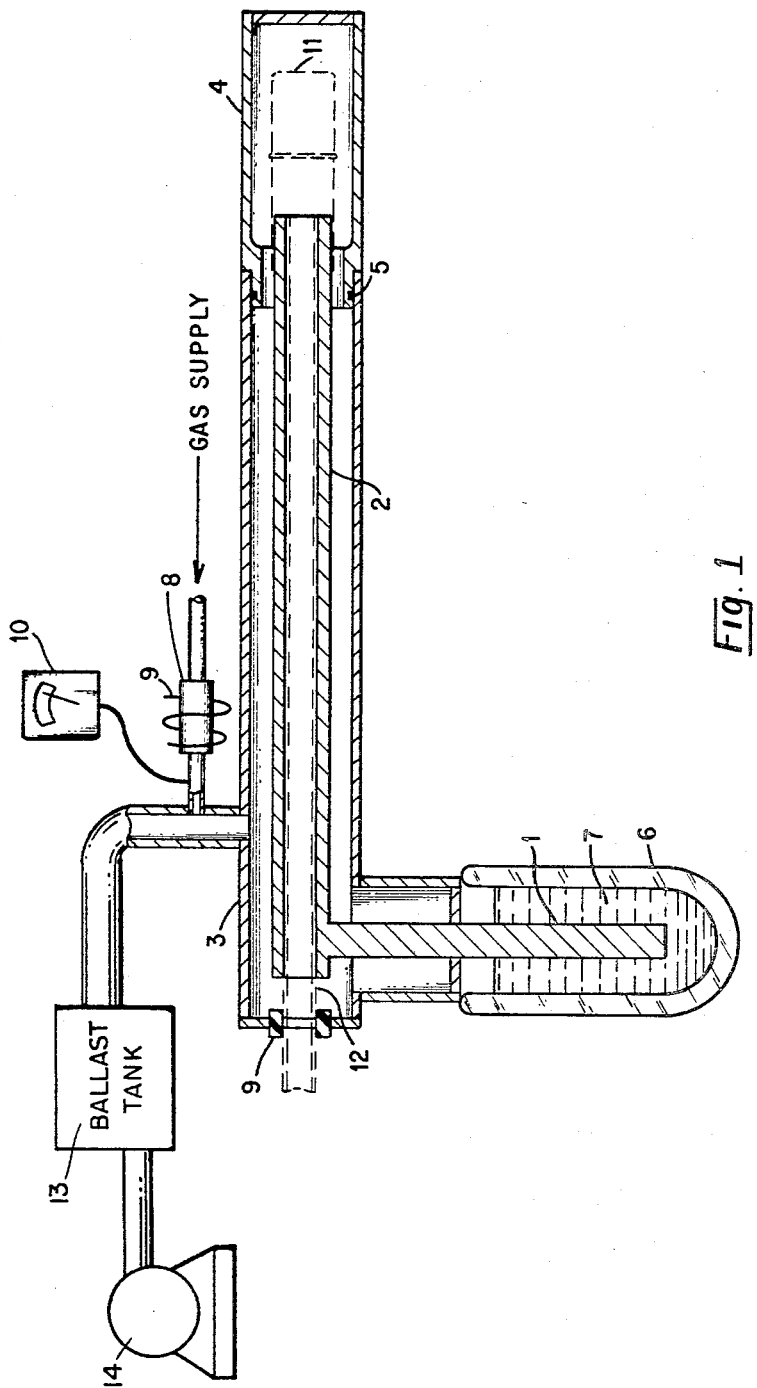
Figure 2:
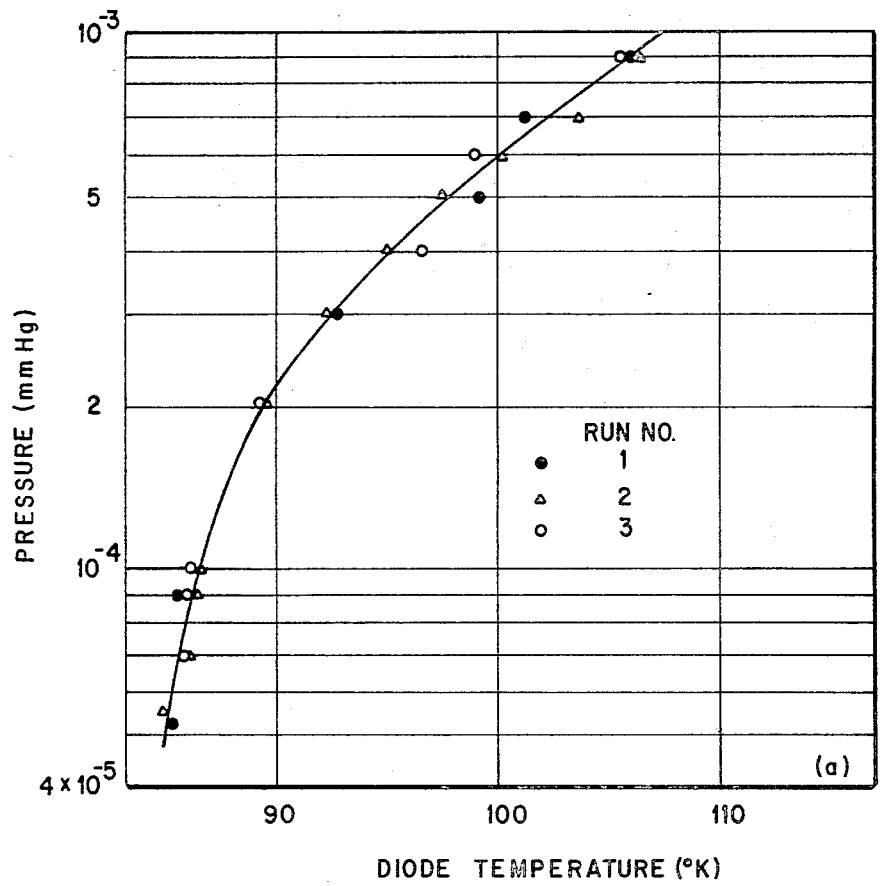
Figure 3:
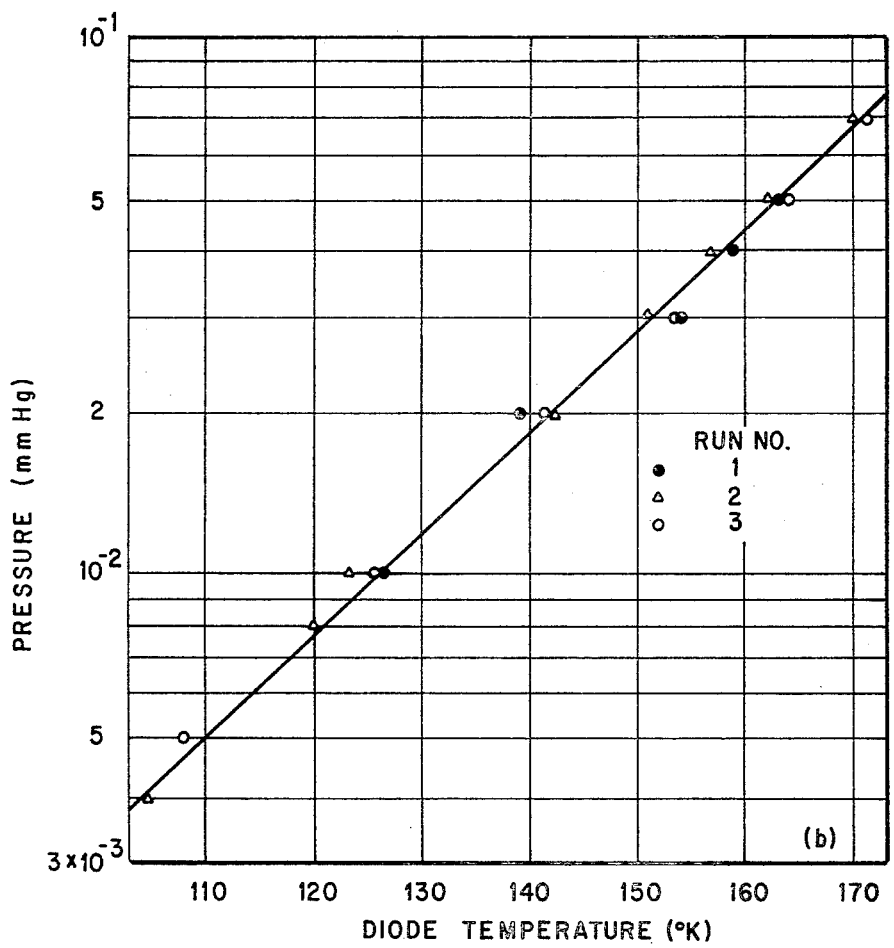

In the drawings, FIG. 1 is a simplified sectional elevation of my improved low temperature device with associated apparatus shown in schematic. FIG. 2 is a graph of pressure against temperature for a diode in the lower pressure range. FIG. 3 is a similar graph of a diode in the upper pressure range.

Applicant's preferred embodiment utilizes an L-shaped, highly conductive, heat transfer element, a first portion of which is cooled by liquid nitrogen and a second portion of which is enclosed in a vacuum jacket. The temperature at the warmer end of the heat transfer element, which is the specimen mounting, is controllable by adjusting the pressure inside the jacket and thereby adjusting the rate at which heat from the ambient atmosphere can be transferred to the specimen.

Referring to FIG. 1, the apparatus comprises a metallic heat conductive element having a vertical solid finger 1 and a horizontally disposed tubular arm 2, a cold finger jacket 3 and a jacket extension 4 sealable thereto by ring seal or slip fit, as desired. The enclosures 3 and 4 in combination permit part of the vertical finger 1 and the horizontal arm 2 to be isolated from the external environment. A Dewar vessel 6 containing liquid 7 permits partial immersion of the vertical cold finger 1 and functions as a heat sink. A palladium leak 8 is provided which is composed of a conventional palladium metal membrane or filter which allows gas to leak or diffuse therethrough at a rate controllable by the temperature of the membrane. In the present embodiment the temperature is preferably controlled by varying the current through a resistance heater element 9 by conventional means. The palladium leak 8 is interposed within a conduit permitting communication of the enclosure with a light gas supply (not shown) such as hydrogen, deuterium, helium, etc. A vacuum gage 10 is in communication with the inside of the enclosure 3. The enclosure 3 is also in communication with a vacuum pumping system including a ballast tank 13 and a vacuum pump 14. A specimen 11 to be examined or operated at a regulated low temperature, shown in phantom, may be placed at the outer end of horizontal arm 2 with a portion disposed therein or it may be in contact with the end thereof. Any necessary electrical leads 12, such as a co-axial cable, pass out through tubular portion 2. It may extend through vacuum seal 9 in the wall of the casing 3 to permit coupling into an external electrical circuit. For mounting, the free end of the line 12 may be internally threaded to coact with the external threads on the specimen (not shown) to be mounted.

The operation of the present system comprises (1) placing an object to be maintained at a constant low temperature within the cold finger shroud extension in contact with the open end of the tubular portion of the heat transfer element; (2) sealably closing the vacuum system, (3) maintaining the finger 1 immersed in boiling liquid nitrogen; (4) constantly vacuum pumping the chamber formed by the shroud or casing 3 and extension or cup 4; (5) adjusting the current flow through heater element 9 by conventional means to a value so that the temperature of the metal filter element of the palladium leak 8 is increased or decreased accordingly, to a value which allows a controlled flow of gas to enter the enclosures 3 and 4 in the area around the tubular portion 2 of the heat transfer element and the specimen 11. By controlling the gas flow into the vacuum system the pressure of the system can be maintained at a predetermined value which is indicated by the gage 10. For example, as the addition of gas to the vacuum system increases, the pressure increases thereby increasing the heat transfer rate from the ambient atmosphere to the tubular portion 2 of the heat transfer element. When the pressure is brought to a steady state value, a corresponding constant heat transfer rate is established thus causing a temperature gradient along the axis of the tubular portion 2 of the metallic heat transfer element, thereby maintaining the specimen 11 at a constant temperature for a given constant pressure.

It will be understood that once the device has been calibrated so that the pressures and their corresponding temperatures are known, the pressure reading of gage 10 may be employed to set the desired temperature within the device.

A subsidiary experiment was performed to determine the relation of the pressure in the cryostat jacket to the temperature of a detector to be examined. Two calibrated Chromel-Alumel thermo-couples, the combination of which spanned the temperature working range, where suitably placed in contact with a dummy detector in the specimen position with their output leads connected to a voltage recorder.

After evacuating the system to a pressure of the order of $10^{-4}$ mm. mercury the solid rod of the cold finger was immersed in a Dewar filled with liquid nitrogen. When the steady state of lowest pressure and temperature was obtained, the temperature and the pressure were measured. The palladium filter was then electrically heated, thus permitting deuterium gas to flow into the system. When a steady pressure state was again obtained, the pressure and corresponding temperature was recorded. Attainment of the steady state was assumed when the pressure and the E.M.F. recorded by the recorder indicating the specimen temperature showed no further change over a period of 20 minutes. The E.M.F.'s of both thermocouples were displayed simultaneously on the recorder. The experiment was performed three times. FIGS. 2 and 3 each show the relation between the pressure inside the system and the crystal temperature obtained in the three different runs made in different pressure ranges. The temperature of the crystal at a given pressure was reproducible to within $\pm 1°$ K.

Having thus described my invention, I claim:

1. In a device for maintaining specimens at low temperature, the improvement comprising, in combination, an insulated container for containing a cryogenic fluid, a heat transfer element having a first portion disposable in the cryogenic fluid and a second portion having means for receiving a specimen to be maintained at a predetermined low temperature, an evacuatable chamber enclosing said second portion of the heat transfer element, said chamber having a sealable and unsealable member providing access to the specimen-receiving means, a vacuum pumping system in communication with the evacuatable chamber means in fluid communication with said chamber for controllably admitting gas thereto to control the chamber pressure, and a vacuum gage in communication with said chamber.

2. The device of claim 1 wherein the insulated container is a Dewar vessel and the liquid is a boiling liquefied permanent gas.

3. The device of claim 1 wherein the evacuatable chamber is exposed to the ambient atmosphere and the second portion of the heat transfer element is tubular to accommodate insulated electrically-conductive means sealed through the chamber wall.

4. The device of claim 1 wherein means for controllably admitting gas into said chamber is a palladium leak in combination with a controllable-temperature heating device and the gas is deuterium.

5. The device of claim 3 wherein the tubular portion of said heat transfer element is adapted to receive specimens at the end opposite the cooled end.

References Cited

UNITED STATES PATENTS

| | | | |
|---|---|---|---|
| 3,296,825 | 1/1967 | Kanzig | 62—514 |
| 3,307,370 | 3/1967 | Klipping | 62—514 XR |
| 3,332,254 | 7/1967 | Elovic | 62—514 |

MEYER PERLIN, *Primary Examiner.*